April 24, 1956    O. E. JOHNSON    2,742,841
TRACTOR-MOUNTED PLOW
Filed April 12, 1952    2 Sheets-Sheet 2
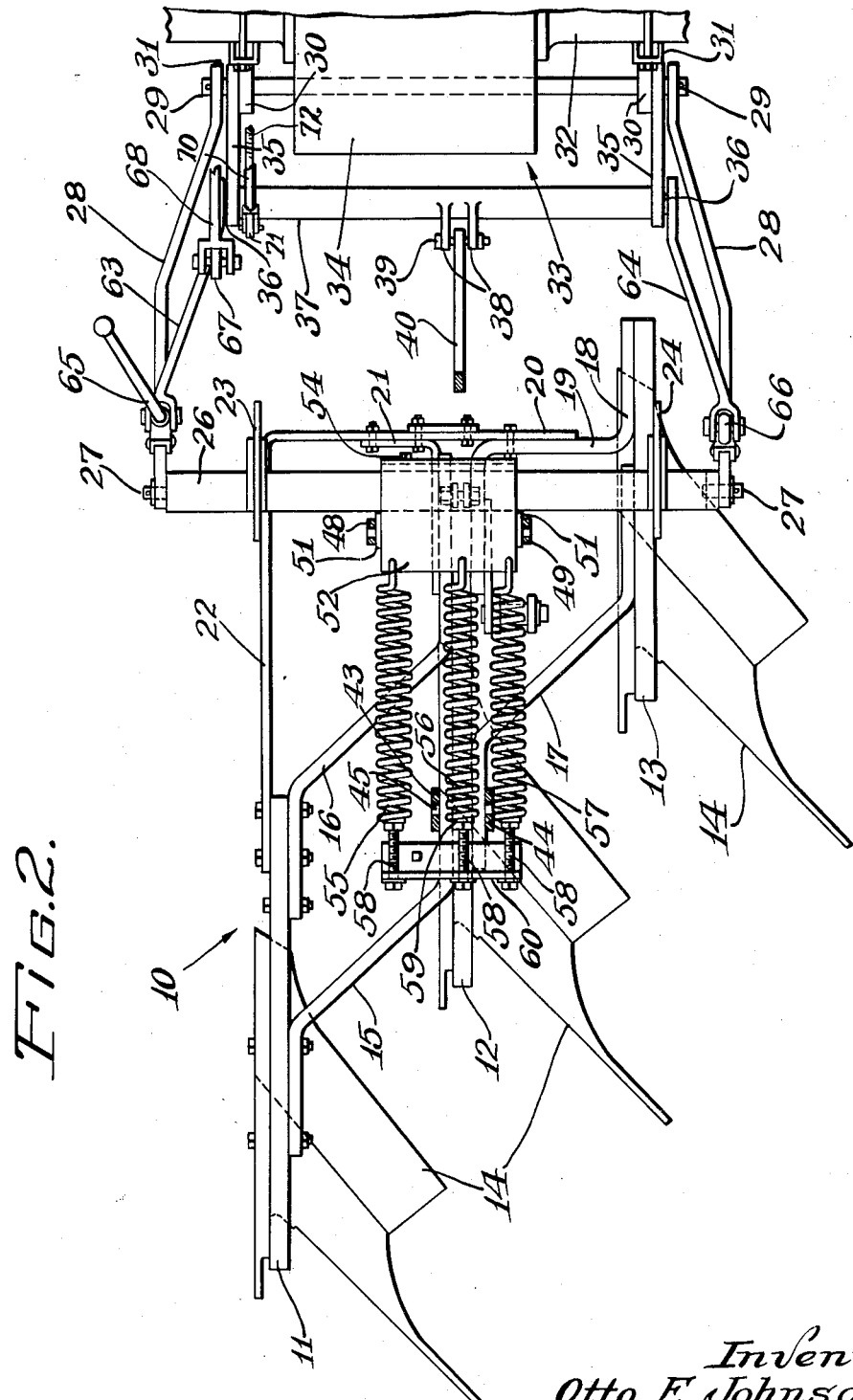
Inventor:
Otto E. Johnson
Paul O. Pippel
Atty.

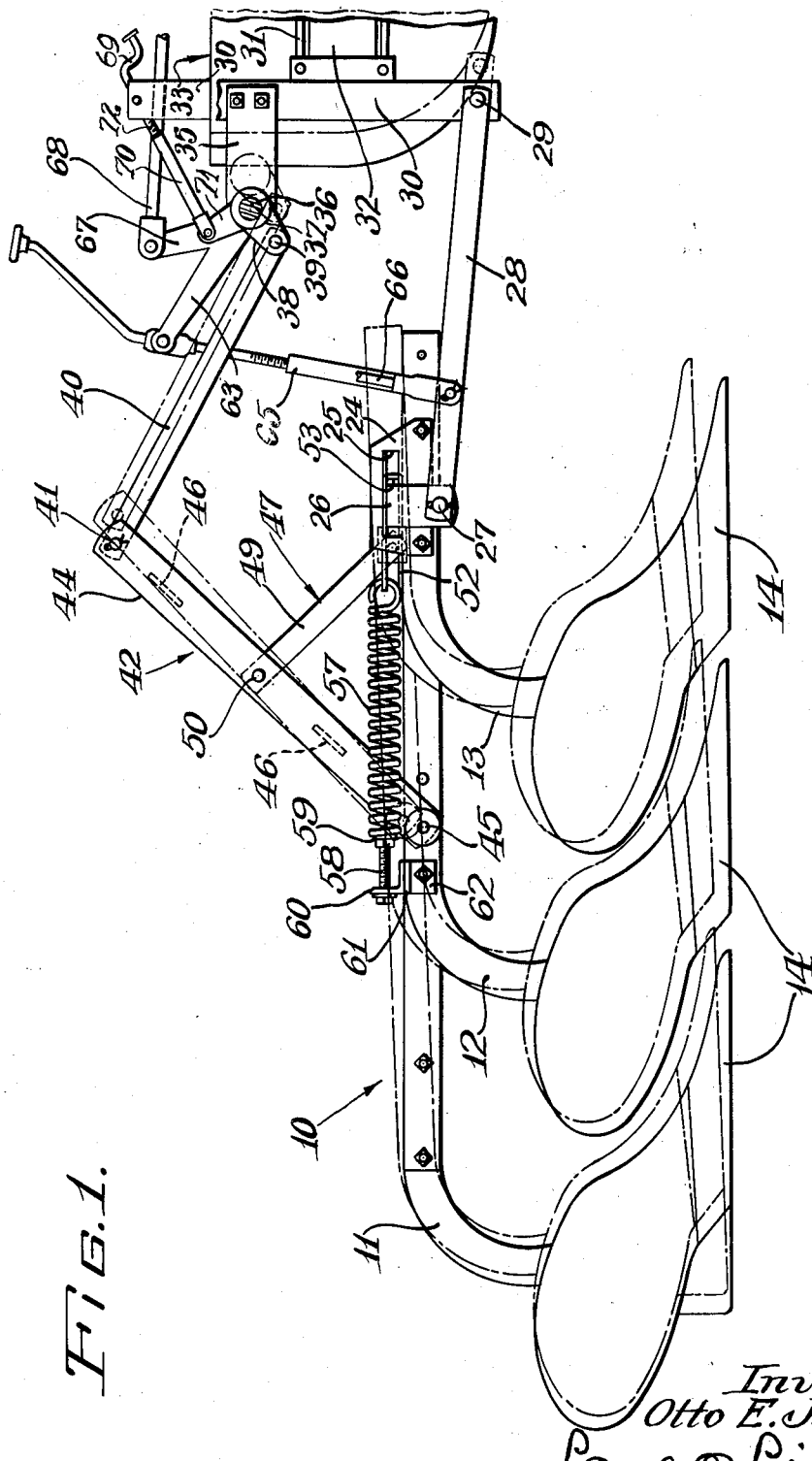

United States Patent Office 2,742,841
Patented Apr. 24, 1956

2,742,841
TRACTOR-MOUNTED PLOW

Otto E. Johnson, Canton, Ill., assignor to International Harvester Company, a corporation of New Jersey Application April 12, 1952, Serial No. 281,993

6 Claims. (Cl. 97—46.93)

This invention relates to agricultural implements and particularly to plows. More specifically the invention concerns a tractor-mounted plow.

The implement of the present invention is adapted to be attached to a tractor by hitch mechanism of the so-called three-point suspension type wherein a pair of laterally spaced links are pivotally connected to the tractor and to the implement and a third link vertically spaced above the lower laterally spaced links is also pivotally connected to the tractor and to an elevated point on the implement. It is an important object of the invention to provide a tractor-mounted plow having incorporated therein means for offsetting the effects of excessive draft upon the implement.

Another object of the invention is the provision of a tractor-mounted implement having means forming part of the implement and its attaching structure for automatically effecting adjustments in the operating position of the earth-working tools under abnormal draft conditions.

A further object of the invention is the provision of a tractor-mounted implement such as a moldboard plow having incorporated therein a cushion spring hitch accommodating relative longitudinal movement between the plow and the propelling vehicle and including means effecting an automatic pitch adjustment of the plow bottoms when abnormal draft conditions are encountered to facilitate uniform plowing.

Other objects and advantages of the invention will become clear from the following detailed description when read in conjunction with the accompanying drawings, wherein:

Fig. 1 is a side elevational view, partly in section, and with parts removed for clarity, of an implement structure incorporating the features of this invention and attached to the rear end of a tractor, only a portion of which is shown, and illustrating by dotted lines relative movement of the plow and tractor when excessive draft is encountered; and Fig. 2 is a plan view, also partly in section, of the structure shown in Fig. 1.

Referring particularly to the drawings, it will be noted that the plow of the present invention comprises a supporting frame 10 which includes laterally spaced longitudinally extending beams 11, 12 and 13 which are curved downwardly at their rear ends and provided with plow bottoms 14. Beams 11 and 12 are connected by diagonal cross braces 15 and 16, and beams 12 and 13 are connected by braces 17 and 18. Brace 18 is provided with a transverse portion 19 connected by a strap 20 with an angle bar 21 secured to beam 12 and to a bar 22 secured to and extending forwardly from beam 11.

Secured to the forward end of the bar 22 and of the beam 13 are respectively, upwardly extending plates 23 and 24. Each of these plates is provided with a longitudinally extending slot 25 which is adapted to slidably receive a draft bar 26 which is rectangular in section and is provided at its ends with pivot pins 27. Each of the pins 27 receives the apertured rear end of a forwardly extending connecting member or link 28. Each of the links 28 is pivotally connected at 29 to the lower end of a vertically extending bracket 30 which is secured by a clamping mechanism 31 to the rear axle housing 32 of a tractor generally designated by the numeral 33. The pivot 29 is in the form of a transversely extending shaft, the ends of which are supported in the lower end of the bracket 30, and it may be noted that a bracket 30 is provided at each side of the tractor body 34. At this point, therefore, it should be understood that, by virtue of the pivots 27 and 29 of the links 28 upon the implement and tractor respectively, the implement is capable of vertical movement relative to the tractor. It should also be understood that by virtue of the reception of draft bar 26 in the slots of plates 23 and 24, the implement is capable of relative longitudinal movement with respect to the draft bar 26 and to the tractor. It should further be understood that by virtue of the lateral spacing of the plates 23 and 24 upon the plow and the connection thereto of the draft bar 26, the implement is stabilized against lateral tilting about a longitudinal axis.

Secured to and extending rearwardly from each of the brackets 30 at opposite sides of the tractor body is a rearwardly extending supporting plate 35, the ends of which are apertured to rotatably receive the ends of a transversely extending rock shaft 36 which, in turn, is provided with a sleeve 37 rockably mounted on shaft 36. Centrally of the sleeve 37, a pair of ears or lugs 38 are provided which are affixed as by welding to the sleeve and extend downwardly and rearwardly therefrom. These ears 38 are apertured to receive a connecting pin 39 to which is pivotally attached the forward end of a forwardly and downwardly extending connecting member or link 40, which is vertically spaced above and between the lower laterally spaced links 28 and forms therewith part of the hitch structure by which the plow supporting frame is connected to the tractor. As shown clearly in Fig. 1, the rear end of link 40 is pivotally mounted upon a pin 41 mounted at the upper end of a standard 42 comprising laterally spaced downwardly diverging straps 43 and 44, the lower ends of which are pivotally mounted upon a pin 45 extending through and carried by the beam 12. Members 43 and 44 are further connected at one or more locations by braces 46. At this point and by virtue of the connection of the implement to the tractor at pivots 27, 29, 39, and 41, the implement is capable of rocking movement relative to the tractor in a vertical plane so that the implement is capable of assuming, upon longitudinal movement of the draft bar 26 in the slot 25, a position such as indicated in dotted lines in Figure 1 in which the plow bottoms are tilted upwardly at their forward ends. As pointed out before, this occurs when the implement encounters abnormal soil conditions imposing excess draft thereupon. The pitch or upward tilting of the plow bottoms toward the front of the implement causes the implement to rise to a shallower depth in the soil and thus lessen the load thereupon. Upon passing the obstruction or the abnormal soil condition, the implement will return to its normal operating position in the soil as indicated in solid lines in Fig. 1.

Tilting of the implement with respect to the tractor about a transverse axis is limited by an upright member 47 which comprises laterally spaced parts 48 and 49 pivotally connected to the standard 42 at 50 and to lugs 51 secured to a U-shaped draft plate 52, the bight portion 53 of which abuts and is secured to the forward edge of the draft bar 26 by one or more suitable bolts 54. The member 47, as will be observed in Fig. 1, extends upwardly and rearwardly, and the lower end thereof, by virtue of its connection to the draft plate 52, moves away from the pivot point 45 of the standard 42 upon the plow frame upon relative movement of the implement frame and the tractor in response to draft thereon. The standard 42 and the member 47 thus participate in a modified jack-knife action with respect to the plow frame upon movement of the implement relative to the tractor in a longitudinal direction.

In order to maintain the plow in its aligned position with respect to the tractor during operation and to overcome shocks to the implement when obstructions are encountered thereby during operation, cushion hitch means are provided in the form of three springs 55, 56, and 57. These springs are extension springs and each is anchored at its forward end to the draft plate 52 at laterally spaced locations and at its rear end is provided with a bolt 58 for each spring, each of which is threaded for reception in a sleeve member 59 carried at the end of the spring, and each of the bolts is slidably received in apertures in the upstanding flange 60 of an angle bar 61 affixed to the central plow beam 12 by one or more lugs 62. These springs are powerful enough to hold the plow against longitudinal movement with respect to the tractor under normal conditions but they will yield when excessive draft is placed upon the plow to allow longitudinal movement of the plow frame relative to the tractor. It may be noted that in order to accommodate the plow to the tilting of the tractor in operating position, the right-hand end of the draft bar 26 is bent downwardly, as clearly shown in Fig. 1, for connection to the right-hand link of the pair of links 28.

Raising and lowering of the plow with respect to the tractor in order to move it between operating and transport position are accomplished by lifting mechanism including rock arms 63 and 64 mounted upon the ends of the rock shaft 36. Rock arm 63 is connected by a lift link 65 to the left-hand connecting link 28, and rock arm 64 is connected by lift link 66 with the right-hand link 28. An arm 67 mounted on the rock arm 63 is connected by a rod 68 with suitable power transmission means, not shown, on the tractor and deriving power therefrom. Longitudinal movement of the connecting rod 68, acting through rock arms 63 and 64, effects vertical movement of the plow between operating and transport positions about the pivots 29 and 39 on the tractor. In normal operation, of course, draft is taken through the links 28 and the link 40 exercises a thrust in a forward and downward direction to stabilize the implement and hold it to its work. As pointed out before, when excessive draft is encountered by the plow, the tractor draws away from it to the extent permitted by slot 25 carrying the draft bar 26 as indicated in dotted lines in Fig. 1. The member 47 is a tension link connecting standard 42 and the forward end of the plow so that the front end tilts upwardly to allow the plow bottoms to attain a shallower depth.

The sleeve 37 is normally held against rocking on the shaft 36 by an adjustable crank member 69 comprising a sleeve portion 70 pivotally connected to an arm 71 affixed to sleeve 37, and a threaded shaft 72 receivable in the sleeve 70 and mounted at the upper end of left-hand upright 30 on the tractor.

The operation of the three-bottom moldboard plow attachment of this invention should be clearly understood from the foregoing description. It should likewise be understood, however, that modifications may be made in the invention without departing from the spirit thereof or the scope of the appended claims.

What is claimed is:

1. In an implement attachment for a tractor to be mounted at the rear thereof, a hitch structure attached to the tractor including lower members pivotally connected to the tractor for vertical swinging and extending rearwardly therefrom, a transverse draft bar carried by said lower members, and an upper centrally positioned thrust link pivotally connected at its forward end to the tractor, an earth-working tool comprising a supporting frame, means having lost motion connecting the frame to said bar at laterally spaced locations to stabilize the tool frame and accommodate limited longitudinal movement of the frame relative to said bar as well as rocking of the tool frame in a vertical plane, a lever extending upwardly and forwardly, said lever being pivotally connected at its lower end to the tool frame and at its upper end to the upper link, a brace member pivotally connecting the draft bar to the lever medially of its ends to react therebetween to rock the tool frame in said vertical plane upon rearward movement of the tool frame relative to the draft bar, and resilient means yieldably resisting said relative movement.

2. In an implement attachment for a tractor to be mounted at the rear thereof, a hitch structure attached to the tractor and extending rearwardly therefrom including vertically spaced connecting members and a transverse draft bar, an earth-working tool comprising a supporting frame, means having lost motion connecting the frame to said bar at laterally spaced locations to stabilize the tool frame and accommodate limited longitudinal movement of the frame relative to said bar as well as pivoting of the tool frame in a vertical plane, a lever extending upwardly and forwardly, said lever being pivotally connected at its lower end to the tool frame and at its upper end to one of said connecting members, a brace member pivotally connecting the draft bar to the lever medially of its ends to react therebetween to rock the tool frame in said vertical plane upon rearward movement of the tool frame relative to the draft bar, and extension spring means centrally positioned between said lost motion connecting means and connected to said tool frame and said draft bar to yieldably resist relative movement between said bar and the tool frame.

3. In an implement attachment for a tractor to be mounted at the rear thereof, a hitch structure attached to the tractor and extending rearwardly therefrom including a pair of laterally spaced generally parallel links connected at their forward ends to the tractor, an upper link vertically spaced above and between said lower links, and a transverse draft bar connecting the rear ends of said lower links, an earth-working tool comprising a supporting frame, means having lost motion connecting the frame to said bar at laterally spaced locations to stabilize the tool frame and accommodate limited longitudinal movement of the frame relative to said bar as well as rocking thereof in a vertical plane, spring means connecting the tool frame to said bar for holding the frame against movement relative to the bar under normal operating conditions, said spring means being yieldable to accommodate longitudinal movement of the tool frame relative to the bar when abnormal resistance is encountered by the earth-working tools, a lever pivotally connected to the tool frame at its lower end and extending upwardly and forwardly at an acute angle to the tool frame and pivotally connected at its upper end to said upper link, said lever being adapted to pivot about its connection to the frame upon longitudinal movement of the frame relative to said bar, and a brace member pivotally connecting the bar to said lever at a location medially of its ends whereby, upon longitudinal movement of the tool frame relative to the draft bar, the tool frame is rocked in said vertical plane.

4. In an implement attachment for a tractor to be mounted at the rear thereof, a hitch structure attached to the tractor and extending rearwardly therefrom including a pair of laterally spaced generally parallel links connected at their forward ends to the tractor, an upper link vertically spaced above and between said pair of links, a transverse draft bar connecting the rear ends of said lower links, an earth-working tool comprising a tool supporting frame, laterally spaced slots formed in said tool frame to slidably receive said draft bar for longitudinal movement of the frame in a substantially straight line relative thereto, said bar being loosely received in said slots to accommodate limited rocking of the tool frame in a vertical plane, stabilizing means to prevent said rocking under normal operating conditions comprising a lever pivotally connected to the tool frame and to said upper link, resilient means yieldably resisting longitudinal movement of the tool frame relative to the draft bar, and a brace pivotally connected to the draft bar and to said lever and reacting thereagainst in response to excessive draft on the tools to cause the tool frame to rock in said vertical plane.

5. In an implement attachment for a tractor to be mounted at the rear thereof, a three-point hitch structure including upper and lower connecting members, an earthworking tool comprising a tool supporting frame, slide and guide means connecting the tool frame to the lower connecting members of the hitch structure to accommodate limited relative longitudinal movement in a substantially straight line therebetween, a standard pivotally mounted on the tool frame extending upwardly and forwardly therefrom and pivotally connected to the upper connecting member of said hitch structure, springs connecting the tool frame to said lower connecting members to resist relative movement therebetween, and a member pivotally connecting said lower connecting members to said standard medially of its ends.

6. In an implement attachment for a tractor to be mounted at the rear thereof, a three-point hitch structure including upper and lower connecting members, an earthworking tool comprising a tool supporting frame, slide and guide means connecting the tool frame to the lower connecting members of the hitch structure to accommodate limited relative longitudinal movement therebetween, a standard pivotally mounted on the tool frame extending upwardly and forwardly therefrom and pivotally connected to the upper connecting member of said hitch frame, springs connecting the tool frame to said lower connecting members to resist relative movement therebetween, and a member pivotally connecting said lower connecting members to said standard medially of its ends, the connection made by said slide and guide means being loose to accommodate limited rocking of the tool frame in a vertical plane relative to the hitch structure in response to abnormal draft upon the tool frame.

References Cited in the file of this patent

UNITED STATES PATENTS

| | | |
|---|---|---|
| 1,381,041 | Warner | June 7, 1921 |

FOREIGN PATENTS

| | | |
|---|---|---|
| 100,793 | Great Britain | Oct. 26, 1916 |
| 553,835 | Great Britain | June 8, 1943 |
| 556,859 | Great Britain | Oct. 26, 1943 |